US007827783B2

(12) United States Patent
Haga et al.

(10) Patent No.: US 7,827,783 B2
(45) Date of Patent: Nov. 9, 2010

(54) EXHAUST GAS PURIFYING APPARATUS FOR INTERNAL COMBUSTION ENGINE

(75) Inventors: Hisao Haga, Wako (JP); Norio Suzuki, Wako (JP); Katsuji Wada, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 467 days.

(21) Appl. No.: 11/905,443

(22) Filed: Oct. 1, 2007

(65) Prior Publication Data

US 2008/0092529 A1 Apr. 24, 2008

(30) Foreign Application Priority Data

Oct. 20, 2006 (JP) ............................ 2006-286021

(51) Int. Cl.
*F01N 3/00* (2006.01)

(52) U.S. Cl. ............................ 60/295; 60/285; 60/286; 60/300; 60/301; 60/273

(58) Field of Classification Search ........... 60/273–274, 60/284–287, 295, 299–301
See application file for complete search history.

(56) References Cited

U.S. PATENT DOCUMENTS 6,044,644 A * 4/2000 Hu et al. ....................... 60/302
2005/0060989 A1* 3/2005 Kawashima et al. .......... 60/295
2005/0284139 A1* 12/2005 Verkiel et al. ................. 60/297
2006/0189480 A1* 8/2006 Takeshima .................. 502/304

FOREIGN PATENT DOCUMENTS

JP 2003-120373 A 4/2003

* cited by examiner

*Primary Examiner*—Thomas E Denion
*Assistant Examiner*—Jesse Bogue
(74) *Attorney, Agent, or Firm*—Arent Fox LLP

(57) ABSTRACT

An exhaust gas purifying apparatus for an internal combustion engine having a NOx removing device provided in an exhaust system of the engine and at least one fuel injector for injecting fuel into a combustion chamber of the engine. A temperature of the NOx removing device is detected and a regeneration process, which removes sulfur oxide accumulated in the NOx removing device, is performed. The regeneration process is performed by performing at least one post injection after performing a main injection by the at least one fuel injector to raise a temperature of the NOx removing device or by increasing a main injection amount of fuel to raise the temperature of the NOx removing device without performing the post injection. The exhaust gases are then controlled to flow into the NOx removing device in the reducing state.

8 Claims, 3 Drawing Sheets

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine and, particularly, to an exhaust gas purifying apparatus including a NOx removing device and which performs a regeneration process for removing sulfur oxide (SOx) accumulated in the NOx removing device.

2. Description of the Related Art

Japanese Patent Laid-open No. 2003-120373 (JP '373) discloses an exhaust gas purifying apparatus having a NOx removing device. According to the disclosed apparatus, a regeneration process for removing sulfur oxide accumulated in the NOx removing device is performed. Specifically, a control which increases a fuel injection amount compared with the usual amount (i.e., a weak lean low-temperature combustion control), and a fuel addition control, which supplies fuel to the exhaust system, are performed until the temperature of the NOx removing device exceeds a predetermined temperature (e.g., 600 degrees Centigrade). When an air-fuel ratio detected by an air-fuel ratio sensor provided in the exhaust system becomes equal to or richer than the stoichiometric ratio, the fuel addition control is stopped and only a weak lean low-temperature combustion control is performed.

According to the apparatus disclosed in JP '373, a reducing component supply mechanism is required in order to supply fuel directly to the exhaust system. Therefore, it is preferable to supply reducing components to the exhaust system by a post injection (i.e., a fuel injection in the expansion stroke or the exhaust stroke after execution of the main injection). However, if an execution time period of the post injection becomes relatively long, dilution of the lubricating oil or degradation of the fuel consumption may easily result. Therefore, it is preferable that the execution time period of the post injection be controlled to be kept to a minimum.

On the other hand, it is necessary to raise a temperature of the NOx removing device to a very high temperature to remove (i.e., reduce) the accumulated sulfur oxide. However, it is confirmed that the reduction of sulfur oxide is possible at a temperature lower than 600 degrees Centigrade, e.g., at a temperature of 500 degrees Centigrade. Therefore, it is possible to remove sulfur oxide by increasing an injection amount of the usual fuel injection (by enrichment of the air-fuel ratio) without supplying fuel directly to the exhaust system or performing the post injection.

SUMMARY OF THE INVENTION

The present invention was made contemplating the above-described points, and an aspect of the present invention is to provide an exhaust gas purifying apparatus for an internal combustion engine which appropriately performs the post injection and enrichment of the air-fuel ratio to remove the sulfur oxide accumulated in the NOx removing device while suppressing dilution of the lubricating oil or degradation of fuel consumption.

To attain the above aspect, the present invention provides an exhaust gas purifying apparatus for an internal combustion engine having a NOx removing device provided in an exhaust system of the engine and fuel injection means for injecting fuel into a combustion chamber of the engine. The exhaust gas purifying apparatus includes a temperature detecting means and a regeneration means. The temperature detecting means detects a temperature of the NOx removing device. The regeneration means performs a regeneration process which removes sulfur oxide accumulated in the NOx removing device. The regeneration means includes a post injection control means and a main injection control means. The post injection control means performs at least one post injection after performing a main injection via the fuel injection means to raise a temperature (TLNC) of the NOx removing device and control exhaust gases flowing into the NOx removing device in a reducing state. The main injection control means increases a main injection amount of fuel to raise the temperature (TLNC) of the NOx removing device, without performing the post injection, and control the exhaust gases flowing into the NOx removing device in the reducing state. When the post injection control means is being operated and the temperature (TLNC) of the NOx removing device is higher than a high-temperature determination temperature (TRHL), the operation of the post injection control means is stopped, and the main injection control means is made to operate.

With the above-described structural configuration, when the regeneration process is performed by the post injection and the temperature of the NOx removing device is higher than the high-temperature determination temperature, the post injection is stopped and the regeneration process is performed by increasing the main injection amount. When the temperature of the NOx removing device is higher than the high-temperature determination temperature, the regeneration process, by increasing the main injection amount, reduces the amount of sulfur oxide while maintaining the temperature of the NOx removing device almost at the same level. Therefore, the execution time period of the post injection is reduced, making it possible to remove the sulfur oxide accumulated in the NOx removing device while suppressing dilution of the lubricating oil and degradation of the fuel consumption.

Further, when the main injection control means is being operated and the temperature (TLNC) of the NOx removing device becomes lower than a low-temperature determination temperature (TRLL), the operation of the main injection control means is stopped, and the post injection control means is made to operate.

With the above-described structural configuration, when the temperature raising control of the NOx removing device is performed by increasing the main injection amount of the fuel without performing any post injection and the temperature of the NOx removing device becomes lower than the low-temperature determination temperature, the regeneration process, by increasing the main injection amount, is switched to the regeneration process by the post injection. Therefore, the temperature of the NOx removing device is maintained at a temperature which is equal to or higher than the low-temperature determination temperature, and the accumulated sulfur oxide is removed.

Preferably, the NOx removing device contains a cerium oxide series material.

With the above-described structural configuration, since the NOx removing device contains the cerium oxide series material, the reduction of sulfur oxide is performed at a lower temperature compared with a NOx removing device not containing the cerium oxide series material.

DETAILED DESCRIPTION OF THE PREFERRED EMBODIMENTS

Preferred embodiments of the present invention will now be described with reference to the drawings.

Figure 1:
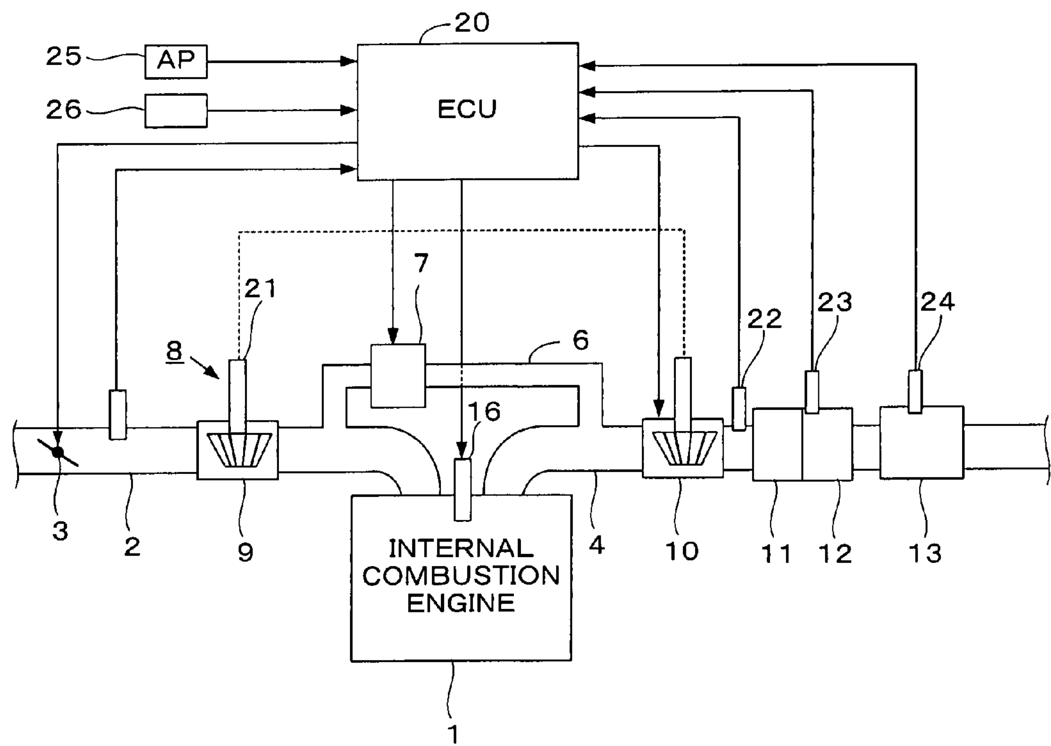
FIG. 1 is a schematic diagram of an internal combustion engine and a control system therefor according to one embodiment of the present invention.

FIG. 1 is a schematic diagram of an internal combustion engine and a control system therefor according to one embodiment of the present invention. An internal combustion engine 1 (hereinafter referred to as "engine") is a diesel engine in which fuel is injected directly into cylinders. Each cylinder is provided with a fuel injection valve 16. The fuel injection valve 16 is electrically connected to the electronic control unit 20 (hereinafter referred to as "ECU 20"). A valve opening time period and a valve opening timing of the fuel injection valve 16 are controlled by the ECU 20.

The engine 1 is provided with an intake pipe 2, an exhaust pipe 4, and a turbocharger 8. The turbocharger 8 has a turbine 10 driven by the kinetic energy of exhaust gases and a compressor 9 for compressing the intake air. The compressor 9 is rotationally driven by the turbine 10.

The turbine 10 has a plurality of movable vanes (not shown) and is configured so that the rotational speed of the turbine 10 is adjusted by changing an opening of the movable vanes (hereinafter referred to as "vane opening"). The vane opening of the turbine 10 is electromagnetically controlled by the ECU 20.

The intake pipe 2 is provided with an intake shutter 3 (throttle valve) for controlling an intake air flow rate on the upstream side of the compressor 9. Opening and closing of the intake shutter 3 is controlled by the ECU 20 through an actuator (not shown). An intake air flow rate sensor 21 for detecting an intake air flow rate is provided downstream of the intake shutter 3 and a detection signal is supplied to the ECU 20.

An exhaust gas recirculation passage 6 is provided between the upstream side of the turbine 10 in the exhaust pipe 4 and the downstream side of the compressor 9 in the intake pipe 2. The exhaust gas recirculation passage 6 recirculates exhaust gases to the intake pipe 2. The exhaust gas recirculation passage 6 is provided with an exhaust gas recirculation control valve 7 (hereinafter referred to as "EGR valve") for controlling an exhaust gas recirculation amount. The EGR valve 7 is an electromagnetic valve having a solenoid. Opening of the EGR valve 7 is controlled by the ECU 20.

The exhaust pipe 4 is provided with a catalytic converter 11 for purifying the exhaust gases, a diesel particulate filter 12 (hereinafter referred to as "DPF"), and a NOx removing device 13 in the listed sequential order from the upstream side.

The catalytic converter 11 contains an oxidation catalyst for promoting oxidization of hydrocarbon and carbon monoxide in the exhaust gases.

The DPF 12 traps soot, which consists of particulates whose main component is carbon (C), in the exhaust gases when the exhaust gases pass through small holes in the filter wall. Specifically, the inflowing soot is accumulated on the surface of the filter wall and in the small hole in the filter wall. For example, ceramic, such as silicon carbide (SiC) or porous material, is used as a material for the filter wall.

The NOx removing device 13 is an integral-type catalyst which consists of carriers covered with two or more different catalyst layers. Specifically, the NOx removing device 13 includes a NOx removing catalyst provided with a first catalyst layer and a second catalyst layer. The first catalyst layer contains a solid acid catalyst having ammonia adsorbing capacity, and the second catalyst layer contains precious metals, such as platinum and cerium oxide series material. As the solid acid catalyst of the first catalyst layer, a zeolite-type catalyst with additives of an iron element and a cerium element is used. As the cerium oxide series material of the second catalyst layer, cerium oxide, composite oxide of cerium oxide, and zirconium oxide, or these oxides with additives of various auxiliary materials is/are used.

The NOx removing device 13 is configured to adsorb NOx in an oxidizing state of the exhaust gases and reduce the adsorbed NOx in a reducing state of the exhaust gases. In the oxidizing state, the air-fuel ratio of the air-fuel mixture burning in the engine 1 is set in a lean region with respect to the stoichiometric ratio. An oxygen concentration in the exhaust gases is therefore relatively high, and a concentration of reducing components (HC and CO) is lower than the oxygen concentration. In the reducing state, the air-fuel ratio is set in a rich region with respect to the stoichiometric ratio. The oxygen concentration in the exhaust gases is therefore relatively low, and the concentration of reducing components is higher than the oxygen concentration. Accordingly, the adsorbed NOx is reduced with the reducing components and emitted as nitrogen gas, steam, and carbon dioxide.

When the amount of NOx adsorbed by the NOx removing catalyst reaches the limit of the NOx adsorbing capacity, i.e., the maximum NOx adsorbing amount, the NOx removing catalyst cannot adsorb any more NOx. Accordingly, to timely reduce NOx, an enrichment of the air-fuel ratio, i.e., a reduction enrichment is performed. Further, if the sulfur oxide (hereinafter referred to as "SOx"), which is generated by oxidization of sulfur (S) contained in the fuel for diesel engines, adheres to the NOx removing catalyst, the NOx adsorbing capacity decreases. Therefore, the regeneration process for timely reducing and removing the SOx is performed. The regeneration process is performed by performing a post injection of fuel or by increasing the main injection amount of fuel as described below. The post injection is a fuel injection performed with the fuel injection valve 16 in the expansion stroke or the exhaust stroke in addition to the normal injection performed in the compression stroke.

Since the NOx removing device 13 contains the cerium oxide series material, the reduction of SOx is performed at a lower temperature compared with a NOx removing device which does not contain the cerium oxide series material.

If the DPF 12 traps soot up to the upper limit of the soot trapping capacity, i.e., to the accumulation limit, the exhaust pressure excessively rises. Therefore, it is necessary to timely perform a process for burning the trapped soot. The post injection is also performed in the soot burning process.

An air-fuel ratio sensor 22 is provided upstream of the catalytic converter 11. The air-fuel ratio sensor 22 detects an air-fuel ratio of an air-fuel mixture burning in the engine 1 according to the oxygen concentration in the exhaust gases. The DPF 12 is provided with an exhaust gas temperature sensor 23 for detecting an exhaust gas temperature. Further, the NOx removing device 13 is provided with a catalyst temperature sensor 24 for detecting a temperature of the NOx removing device 13 (specifically, a temperature of the NOx removing catalyst in the NOx removing device 13, hereinafter referred to as "catalyst temperature TLNC"). The detection signals of the sensors 22 to 24 are supplied to the ECU 20.

The ECU 20 is connected to an accelerator sensor 25 for detecting an operation amount AP of the accelerator of the vehicle driven by the engine 1 and a crank angle position sensor 26 for detecting a rotation angle of the crankshaft of the engine 1. The detection signals of the sensors are supplied to the ECU 20. A demand torque TRQ of the engine 1 is calculated to be substantially proportional to the accelerator operation amount AP, and the rotational speed NE of the engine 1 is calculated from an output of the crank angle position sensor 26.

The ECU 20 includes an input circuit, a central processing unit (hereinafter referred to as "CPU"), a memory circuit, and an output circuit. The input circuit performs numerous functions, including shaping the waveforms of the input signals from the various sensors, correcting the voltage levels of the input signals to a predetermined level, and converting analog signal values into digital signal values. The memory circuit preliminarily stores various operating programs to be executed by the CPU and stores the computation results, and the like. The output circuit supplies control signals to the fuel injection valve 16, the EGR valve 7, and the like.

Figure 2:
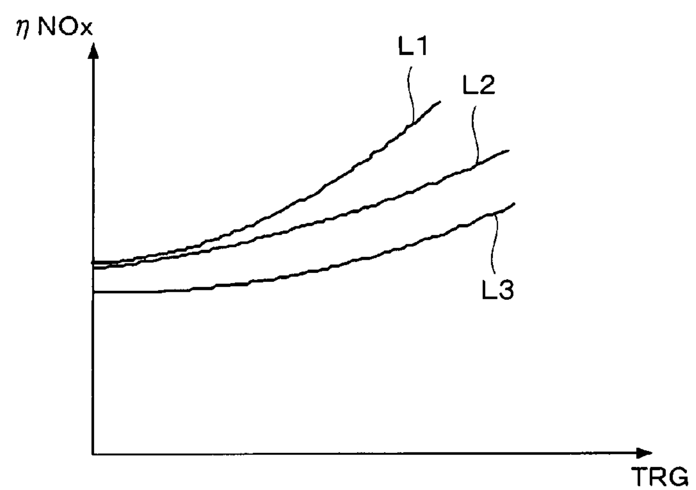
FIG. 2 is a graph showing a relationship between an execution time period (TRG) of a regeneration process of a NOx removing device and a NOx removing rate $\eta$NOx.

FIG. 2 is a graph showing a relationship between an execution time period TRG of the regeneration process by increasing the main injection amount QIM and a NOx removing rate ηNOx. The curve L1 shows a characteristic corresponding to the case where the catalyst temperature TLNC is 600 degrees Centigrade and the air-fuel ratio A/F is set to "14". The curve L2 shows a characteristic corresponding to the case where the catalyst temperature TLNC is 500 degrees Centigrade and the air-fuel ratio A/F is set to "13". The curve L3 shows a characteristic corresponding to the case where the catalyst temperature TLNC is 500 degrees Centigrade and the air-fuel ratio A/F is set to "14". As apparent from FIG. 2, even if the catalyst temperature TLNC is about 500 degrees Centigrade, SOx is removed and the NOx removing rate ηNOx is improved by the regeneration process of increasing the main injection amount QIM.

Figure 3:
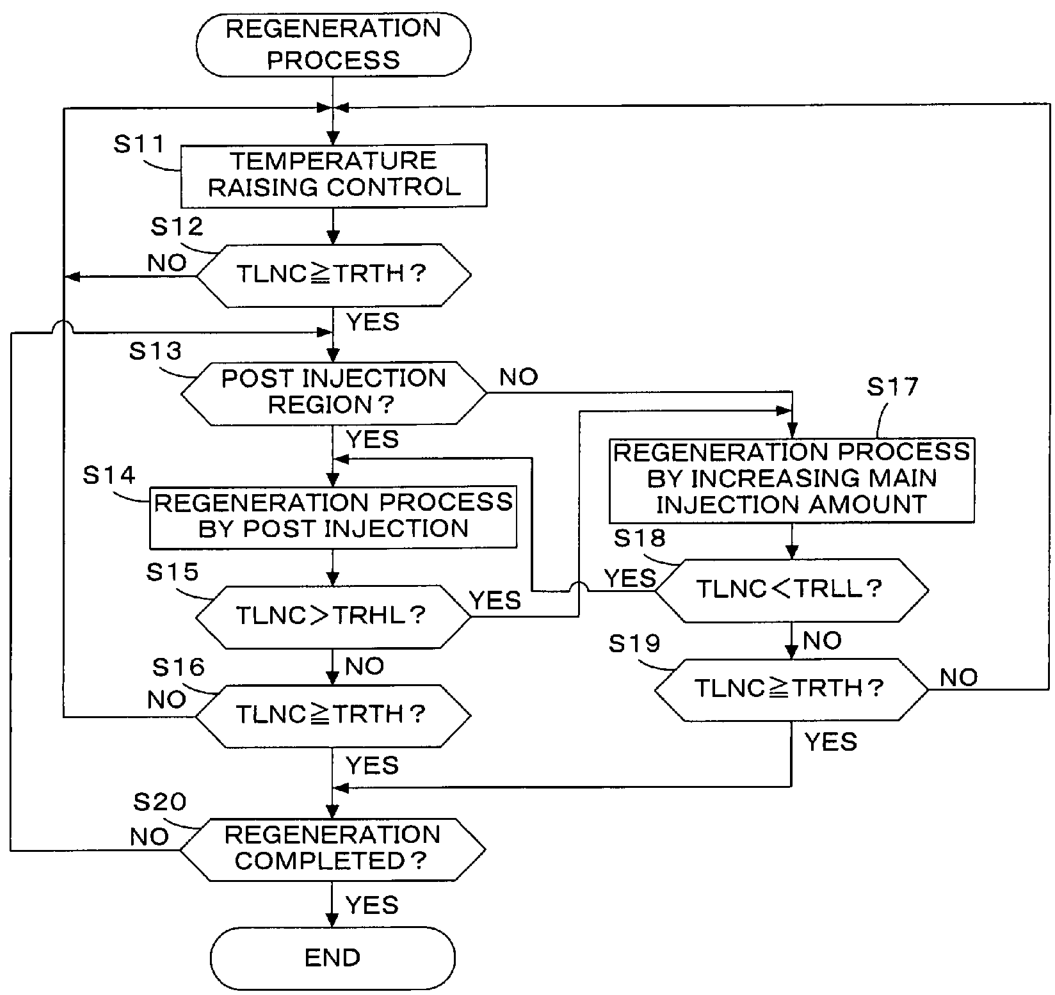
FIG. 3 is a flowchart of a regeneration process of the NOx removing device.

FIG. 3 is a flowchart showing a method of the regeneration process described above. The regeneration process is executed by the CPU in the ECU 20 when a predetermined regeneration process execution condition is satisfied.

In step S11, a temperature raising control is performed and the rise in the temperature of the NOx removing device 13 is promoted. Specifically, a suitable combination of retarding the main injection timing of fuel, performing the post injection, increasing an amount of fuel of the post injection, and decreasing an intake air amount is performed in the temperature raising control.

In step S12, it is determined whether the catalyst temperature TLNC is equal to or higher than a temperature threshold value TRTH (e.g., 450 degrees Centigrade). The temperature threshold value TRTH is the minimum temperature for performing the regeneration process. If the answer to step S12 is negative (NO), the process returns to step S11 wherein the temperature raising control is continued.

Figure 4:
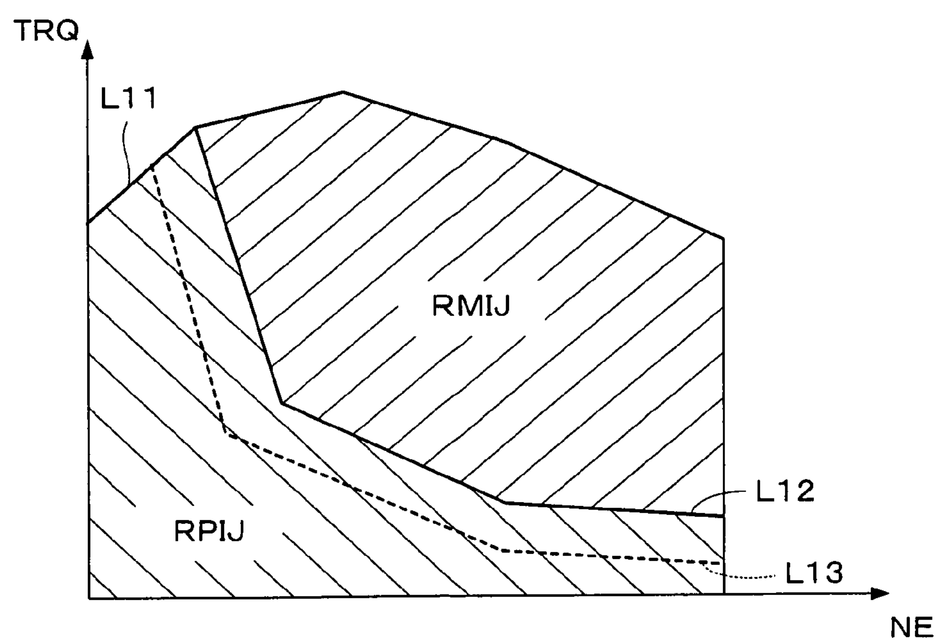
FIG. 4 is a diagram showing an engine operating region (RPIJ), wherein a regeneration process by post injection is performed, and an engine operating region (RMIJ) wherein a regeneration process is performed by increasing the main injection amount.

When TLNC is equal to or higher than TRTH, it is determined whether the operating condition of the engine 1 is in a post injection region RPIJ (step S13). Specifically, it is determined whether the operating condition determined by the engine rotational speed NE and the demand torque TRQ is in the post injection region RPIJ shown in FIG. 4 (i.e., the region below the solid lines L11 and L12) in FIG. 4. The post injection region RPIJ shown in FIG. 4 is an engine operating region where the regeneration process is performed by the post injection, and the region RMIJ shown in FIG. 4 is an engine operating region where the regeneration process is performed by increasing the main injection amount QIM (hereinafter referred to as "main injection region RMIJ").

When the engine operating condition is in the post injection region RPIJ in step S13, the regeneration process by the post injection is performed (step S14). In this regeneration process, the post injection is performed while controlling the intake air flow rate to a predetermined intake air flow rate by adjusting the opening of the intake shutter 3. The post injection fuel amount is feedback-controlled so that the air-fuel ratio AFACT detected by the air-fuel ratio sensor 22 coincides with the target air-fuel ratio AFCMD set according to the catalyst temperature TLNC. In step S14, the detected air-fuel ratio AFACT is obtained by detecting the oxygen concentration in the exhaust gases. The detected air-fuel ratio AFACT decreases as the post injection fuel amount increases.

In step S15, it is determined whether the catalyst temperature TLNC exceeds a high-temperature determination temperature TRHL (e.g., 600 degrees Centigrade). If the answer to step S15 is negative (NO), it is determined as in step S12 whether the catalyst temperature TLNC is equal to or higher than the temperature threshold value TRTH (step S16).

If the catalyst temperature TLNC decreases to become lower than the temperature threshold value TRTH, the process returns to step S11. If TLNC is equal to or higher than TRTH, it is determined whether the regeneration (removal of SOx) is completed (step S20). For example, the regeneration is determined to be completed when an integrated value TRGT, which is obtained by integrating the time period during which the catalyst temperature TLNC exceeds the temperature threshold value TRTH, reaches a predetermined determination time period TRGTTH.

If the regeneration is not completed, the process returns to step S13. If the regeneration is completed, the process ends.

In step S15, if the catalyst temperature TLNC exceeds the high-temperature determination temperature TRHL, the process proceeds to step S17 wherein the regeneration process is performed by increasing the main injection amount QIM. In this regeneration process, the main injection amount QIM is feedback-controlled so that the detected air-fuel ratio AFACT coincides with the target air-fuel ratio AFCMD which is set according to the catalyst temperature TLNC.

In step S18, it is determined whether the catalyst temperature TLNC is lower than the low-temperature determination temperature TRLL (e.g., 500 degrees Centigrade). If the answer to step S18 is negative (NO), it is determined whether the catalyst temperature TLNC is equal to or higher than the temperature threshold value TRTH (step S19). If the answer to step S19 is affirmative (YES), the process proceeds to step S20. If the answer to step S19 is negative (NO), i.e., if the catalyst temperature TLNC becomes lower than the temperature threshold value TRTH, the process returns to step S11.

If the answer to step S18 is affirmative (YES), i.e., if the catalyst temperature TLNC becomes equal to or lower than the low-temperature determination temperature TRLL, the process proceeds to step S14 wherein the regeneration process by the post injection is performed.

As described above, according to the process of FIG. 3, when the catalyst temperature TLNC is higher than the high-temperature determination temperature TRHL and the regeneration process by the post injection is performed, the regeneration process by the post injection is switched to the regeneration process by increasing the main injection amount QIM. When the catalyst temperature TLNC is higher than the high-temperature determination temperature TRHL, the regeneration process performed by increasing the main injection amount QIM can also reduce and remove SOx while maintaining the catalyst temperature TLNC almost at the same level. That is, according to the process of FIG. 3, the main injection region RMIJ is substantially extended to the region shown by the dashed line L13 of FIG. 4 according to the catalyst temperature TLNC. Accordingly, the execution time period of the post injection is reduced. Therefore, it is possible to remove the SOx accumulated in the NOx removing device 13 while suppressing dilution of the lubricating oil and degradation of fuel consumption.

Further, when the catalyst temperature TLNC becomes lower than the low-temperature determination temperature TRLL, which is lower than the high-temperature determination temperature TRHL, the regeneration process performed by increasing the main injection amount is switched to the regeneration process by the post injection. Therefore, the catalyst temperature TLNC is maintained at a temperature which is equal to or higher than the low-temperature determination temperature TRLL, and the accumulated SOx is removed.

In the present embodiment, the fuel injection valve 16 corresponds to the fuel injection means; the catalyst temperature sensor 24 corresponds to the temperature detecting means; and the ECU 20 includes the regeneration means, the post injection control means, and the main injection control means. Specifically, the process of FIG. 3 corresponds to the regeneration means. Step S14 of FIG. 3 corresponds to the post injection control means, and step S17 corresponds to the main injection control means.

In the above-described embodiment, the post injection is performed once after the main injection. Alternatively, the post injection may be performed by two or more divided injections.

Further, the present invention can also be applied to an exhaust gas purifying apparatus for a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all modifications which come within the meaning and range of equivalency of the claims are, therefore, to be embraced therein.

What is claimed is:

1. An exhaust gas purifying apparatus for an internal combustion engine having a NOx removing device provided in an exhaust system of the engine and fuel injection means for injecting fuel into a combustion chamber of said engine, the exhaust gas purifying apparatus comprising:

temperature detecting means for detecting a temperature of said NOx removing device; and regeneration means for performing a regeneration process which removes sulfur oxide accumulated in said NOx removing device, wherein said regeneration means includes:

post injection control means for performing at least one post injection after performing a main injection by said fuel injection means to raise a temperature of said NOx removing device and control exhaust gases flowing into said NOx removing device in a reducing state;

main injection control means for increasing a main injection amount of fuel to raise the temperature of said NOx removing device, without performing the post injection, and control the exhaust gases flowing into said NOx removing device in the reducing state; and determining means for determining whether the temperature of said NOx removing device is equal to or higher than a temperature threshold value at which the sulfur oxide accumulated in said NOx removing device is removable, wherein when said post injection control means is being operated and the temperature of said NOx removing device is higher than a high-temperature determination temperature under the condition where the temperature of said NOx removing device is determined to be equal to or higher than the temperature threshold value, the operation of said post injection control means is stopped and said main injection control means is made to operate.

2. The exhaust gas purifying apparatus according to claim 1, wherein the NOx removing device contains a cerium oxide series material.

3. An exhaust gas purifying apparatus for an internal combustion engine having a NOx removing device provided in an exhaust system of the internal combustion engine and fuel injection means for injecting fuel into a combustion chamber of the engine, the exhaust gas purifying apparatus comprising:

temperature detecting means for detecting a temperature of said NOx removing device; and regeneration means for performing a regeneration process which removes sulfur oxide accumulated in said NOx removing device, wherein said regeneration means includes:

post injection control means for performing at least one post injection after performing a main injection by said fuel injection means to raise a temperature of said NOx removing device and control exhaust gases flowing into said NOx removing device in a reducing state;

main injection control means for increasing a main injection amount of fuel to raise the temperature of the NOx removing device, without performing the post injection, and control the exhaust gases flowing into said NOx removing device in the reducing state; and determining means for determining whether the temperature of said NOx removing device is equal to or higher than a temperature threshold value at which the sulfur oxide accumulated in said NOx removing device is removable, wherein when said main injection control means is being operated and the temperature of said NOx removing device becomes lower than a low-temperature determination temperature under the condition where the temperature of said NOx removing device is determined to be equal to or higher than the temperature threshold value, the operation of said main injection control means is stopped and said post injection control means is made to operate.

4. The exhaust gas purifying apparatus according to claim 3, wherein the NOx removing device contains a cerium oxide series material.

5. An exhaust gas purifying method for an internal combustion engine having a NOx removing device provided in an exhaust system of the engine and at least one fuel injector for injecting fuel into a combustion chamber of said engine, the exhaust gas purifying method comprising the steps of:

a) detecting a temperature of said NOx removing device; and b) performing a regeneration process which removes sulfur oxide accumulated in said NOx removing device, wherein the regeneration process is performed by the following steps i) or ii) and iii):

i) performing at least one post injection after performing a main injection by said at least one fuel injector to raise a temperature of said NOx removing device and control exhaust gases flowing into said NOx removing device in a reducing state;

ii) increasing a main injection amount of fuel to raise the temperature of said NOx removing device, without performing the post injection, and control the exhaust gases flowing into said NOx removing device in the reducing state; and iii) determining whether the temperature of said NOx removing device is equal to or higher than a temperature threshold value at which the sulfur oxide accumulated in said NOx removing device is removable, wherein when the at least one post injection is being performed and the temperature of said NOx removing device is higher than a high-temperature determination temperature under the condition where the temperature of said NOx removing device is determined to be equal to or higher than the temperature threshold value, the post injection is stopped and the main injection amount of fuel is increased.

6. An exhaust gas purifying method for an internal combustion engine having a NOx removing device provided in an exhaust system of the internal combustion engine and at least one fuel injector for injecting fuel into a combustion chamber of the engine, the exhaust gas purifying method comprising the steps of:

a) detecting a temperature of said NOx removing device; and b) performing a regeneration process which removes sulfur oxide accumulated in said NOx removing device, wherein the regeneration process is performed by the following steps i) or ii) and iii):

i) performing at least one post injection after performing a main injection by said at least one fuel injector to raise a temperature of said NOx removing device and control exhaust gases flowing into said NOx removing device in a reducing state;

ii) increasing a main injection amount of fuel to raise the temperature of the NOx removing device, without performing the post injection, and control the exhaust gases flowing into said NOx removing device in the reducing state; and iii) determining whether the temperature of said NOx removing device is equal to or higher than a temperature threshold value at which the sulfur oxide accumulated in said NOx removing device is removable, wherein when the main injection amount of fuel is being increased without performing the post injection and the temperature of said NOx removing device becomes lower than a low-temperature determination temperature under the condition where the temperature of said NOx removing device is determined to be equal to or higher than the temperature threshold value, an incremental increase of the main injection amount is stopped and the at least one post injection is performed.

7. A non-transistory computer-readable medium containing a computer program for causing a computer to implement an exhaust gas purifying method for an internal combustion engine having a NOx removing device provided in an exhaust system of the engine and at least one fuel injector for injecting fuel into a combustion chamber of said engine, the exhaust gas purifying method comprising the steps of:

a) detecting a temperature of said NOx removing device; and b) performing a regeneration process which removes sulfur oxide accumulated in said NOx removing device, wherein the regeneration process is performed by the following steps i) or ii) and iii):

i) performing at least one post injection after performing a main injection by said at least one fuel injector to raise a temperature of said NOx removing device and control exhaust gases flowing into said NOx removing device in a reducing state;

ii) increasing a main injection amount of fuel to raise the temperature of said NOx removing device, without performing the post injection, and control the exhaust gases flowing into said NOx removing device in the reducing state; and iii) determining whether the temperature of said NOx removing device is equal to or higher than a temperature threshold value at which the sulfur oxide accumulated in said NOx removing device is removable, wherein when the at least one post injection is being performed and the temperature of said NOx removing device is higher than a high-temperature determination temperature under the condition where the temperature of said NOx removing device is determined to be equal to or higher than the temperature threshold value, the post injection is stopped and the main injection amount of fuel is increased.

8. A non-transistory computer-readable medium containing a computer program for causing a computer to implement an exhaust gas purifying method for an internal combustion engine having a NOx removing device provided in an exhaust system of the internal combustion engine, and at least one fuel injector for injecting fuel into a combustion chamber of the engine, the exhaust gas purifying method comprising the steps of:

a) detecting a temperature of said NOx removing device; and b) performing a regeneration process which removes sulfur oxide accumulated in said NOx removing device, wherein the regeneration process is performed by the following steps i) or ii) and iii):

i) performing at least one post injection after performing a main injection by said at least one fuel injector to raise a temperature of said NOx removing device and control exhaust gases flowing into said NOx removing device in a reducing state;

ii) increasing a main injection amount of fuel to raise the temperature of the NOx removing device, without performing the post injection, and control the exhaust gases flowing into said NOx removing device in the reducing state; and iii) determining whether the temperature of said NOx removing device is equal to or higher than a temperature threshold value at which the sulfur oxide accumulated in said NOx removing device is removable, wherein when the main injection amount of fuel is being increased without performing the post injection and the temperature of said NOx removing device becomes lower than a low-temperature determination temperature under the condition where the temperature of said NOx removing device is determined to be equal to or higher than the temperature threshold value, an incremental increase of the main injection amount is stopped and the at least one post injection is performed.

* * * * *